United States Patent
Boca et al.

(10) Patent No.: US 9,807,292 B2
(45) Date of Patent: Oct. 31, 2017

(54) TECHNOLOGIES FOR PAN TILT UNIT CALIBRATION

(71) Applicant: ABB Technology Ltd., Zurich (CH)

(72) Inventors: Remus Boca, Simsbury, CT (US); Jianjun Wang, West Hartford, CT (US); Thomas Fuhlbrigge, Ellington, CT (US); Biao Zhang, West Hartford, CT (US)

(73) Assignee: ABB Schweiz AG, Baden (CH)

( * ) Notice: Subject to any disclaimer, the term of this patent is extended or adjusted under 35 U.S.C. 154(b) by 167 days.

(21) Appl. No.: 14/755,476

(22) Filed: Jun. 30, 2015

(65) Prior Publication Data

US 2017/0006209 A1    Jan. 5, 2017

(51) Int. Cl.
*H04N 5/232* (2006.01)
*H04N 17/00* (2006.01)
(Continued)

(52) U.S. Cl.
CPC .......... *H04N 5/23203* (2013.01); *B25J 9/161* (2013.01); *B25J 9/1692* (2013.01);
(Continued)

(58) Field of Classification Search
CPC  G06T 7/20; G06T 7/60; Y10S 901/09; G05B 2219/40617
See application file for complete search history.

(56) References Cited

FOREIGN PATENT DOCUMENTS

| EP | 1607194 A2 | 12/2005 | |
|---|---|---|---|
| JP | EP 1607194 A2 * | 12/2005 | ............ B25J 9/1682 |

OTHER PUBLICATIONS

Gatla C S et al. "Calibrating Pan-Tilt Cameras in Robot Hand-Eye Systems Using a Single Point," 2007 IEEE International Conference on Robotics and Automation—Apr. 10-14, 2007—Roma, Italy, IEEE, Piscataway, NJ, USA, Apr. 10, 2007, pp. 3186-3191, XP31389289, ISBN: 978-1-4244-0601-2.*

(Continued)

*Primary Examiner* — Andy Rao
*Assistant Examiner* — Tyler Edwards
(74) *Attorney, Agent, or Firm* — Barnes & Thornburg LLP (57) ABSTRACT

Technologies for calibrating a pan tilt unit with a robot include a robot controller to move a camera of the pan tilt unit about a first rotational axis of the pan tilt unit to at least three different first axis positions. The robot controller records a first set of positions of a monitored component of the robot in a frame of reference of the robot and a position of the camera in a frame of reference of the pan tilt unit during a period in which the monitored component is within a field of view of the camera for each of the at least three different first axis positions. Further, the robot controller moves the camera about a second rotational axis of the pan tilt unit to at least three different second axis positions and records a second set of positions of the monitored component in the frame of reference of the robot and a position of the camera in the frame of reference of the pan tilt unit during a period in which the monitored component is within a field of view of the camera for each of the at least three different second axis positions. Further, the robot controller determines a transformation from the frame of reference of the robot to the frame of reference of the pan tilt unit based on the first set of recorded positions and the second set of recorded positions.

20 Claims, 5 Drawing Sheets

(51) Int. Cl.

| | | |
|---|---|---|
| *H04N 7/18* | (2006.01) | |
| *B25J 9/16* | (2006.01) | |
| *G06T 7/60* | (2017.01) | |
| *G06K 9/52* | (2006.01) | |
| *G06T 7/20* | (2017.01) | |
| *G06T 7/00* | (2017.01) | |
| *G06T 7/70* | (2017.01) | |

(52) U.S. Cl.
CPC ............. *B25J 9/1697* (2013.01); *G06K 9/52* (2013.01); *G06T 7/20* (2013.01); *G06T 7/60* (2013.01); *G06T 7/70* (2017.01); *H04N 5/232* (2013.01); *H04N 7/18* (2013.01); *H04N 17/002* (2013.01); *G05B 2219/40617* (2013.01); *Y10S 901/09* (2013.01)

(56) References Cited

OTHER PUBLICATIONS

International Search Report, International Application No. PCT/US2016/039649, dated Oct. 20, 2016, 6 pages.
International Written Opinion, International Application No. PCT/US2016/039649, dated Oct. 20, 2016, 9 pages.
Gatla et al., "Calibrating Pan-Tilt Cameras in Robot Hand-Eye Systems Using a Single Point", 2007 IEEE International conference on Robotics and Automations, Apr. 10-14, 2007, pp. 3186-3191.
Shiu et al,. "Calibration of Wrist-Mounted Robotic Sensors by Solving Homogeneous Transform Equations of the Form AX=XB", IEEE Transactions on Robotics and Automation, vol. 5, No. 1, Feb. 1989, 14 pages.

\* cited by examiner

TECHNOLOGIES FOR PAN TILT UNIT CALIBRATION

BACKGROUND

Robot tools are often monitored (e.g., tracked and/or visualized) for remote control applications, telepresence robotic applications, robotic program debugging, and various other robotic applications. For example, in many embodiments, a tool positioned at the end of an articulated arm of a robot is monitored by a camera capable of moving to change its field of view (e.g., a pan tilt unit). In order to monitor the robot tool and/or ensure that the robot tool is maintained within the field of view of the camera, computer vision and image processing algorithms are generally employed. It should be appreciated that computer vision and image processing algorithms and techniques may be significantly computationally intensive and/or result in delay associated with a large number of real-time computations.

SUMMARY

According to one aspect, a robot controller for calibrating a pan tilt unit may include an arm control module configured to operate an articulating arm and a robot tool of the robot, a pan tilt unit control module to move a camera of the pan tilt unit about a first rotational axis of the pan tilt unit to at least three different first axis positions and move the camera about a second rotational axis of the pan tilt unit to at least three different second axis positions, a position recording module to record a first set of positions of the robot tool in a frame of reference of the robot and a position of the camera in a frame of reference of the pan tilt unit during a period in which the robot tool is within a field of view of the camera for each of the at least three different first axis positions and record a second set of positions of the robot tool in the frame of reference of the robot and a position of the camera in the frame of reference of the pan tilt unit during a period in which the robot tool is within a field of view of the camera for each of the at least three different second axis positions, and a transformation module to determine a transformation from the frame of reference of the robot to the frame of reference of the pan tilt unit based on the first set of recorded positions and the second set of recorded positions.

In some embodiments, the frame of reference of the robot is a coordinate system defined by a base of the robot. Determining the transformation may include determining a first plane defined by the first set of recorded positions and determining a second plane defined by the second set of recorded positions. In some embodiments, determining the transformation may include determining an intersection line of the first plane and the second plane. Additionally, in some embodiments, determining the transformation may include determining an origin of the frame of reference of the pan tilt unit based on the intersection line.

In some embodiments, the arm control module may be configured to move the robot tool to a position such that the robot tool is centered within a field of view of the camera for each of the at least three different first axis positions. Recording the first set of positions may include recording the first set of positions during a period in which the robot tool is centered within the field of view of the camera. In some embodiments, moving the camera about the first rotational axis may include panning the camera and moving the camera about the second rotational axis may include tilting the camera.

In some embodiments, the transformation module may further determine a position of the robot tool in the frame of reference of the robot and determine a corresponding position of the robot tool in the frame of reference of the pan tilt unit based on the transformation. In some embodiments, the pan tilt unit control module may move the camera to a position in which the corresponding position of the robot tool is within a field of view of the camera.

According to another aspect, a method for calibrating a pan tilt unit with a robot may include moving a camera of the pan tilt unit about a first rotational axis of the pan tilt unit to at least three different first axis positions, recording a first set of positions of a monitored component of the robot in a frame of reference of the robot and a position of the camera in a frame of reference of the pan tilt unit during a period in which the monitored component is within a field of view of the camera for each of the at least three different first axis positions, moving the camera about a second rotational axis of the pan tilt unit to at least three different second axis positions, recording a second set of positions of the monitored component in the frame of reference of the robot and a position of the camera in the frame of reference of the pan tilt unit during a period in which the monitored component is within a field of view of the camera for each of the at least three different second axis positions, and determining a transformation from the frame of reference of the robot to the frame of reference of the pan tilt unit based on the first set of recorded positions and the second set of recorded positions.

In some embodiments, the frame of reference of the robot may be a coordinate system defined by a base of the robot. The monitored component may be a robot tool secured to an articulated arm of the robot. In some embodiments, determining the transformation may include determining a first plane defined by the first set of recorded positions and determining a second plane defined by the second set of recorded positions. Determining the transformation may include determining an intersection line of the first plane and the second plane. In some embodiments, determining the transformation may include determining an origin of the frame of reference of the pan tilt unit based on the intersection line.

In some embodiments, the method may further include improving an accuracy of the transformation by applying a Levenberg-Marquardt algorithm based on the first set of recorded positions and the second set of recorded positions. Recording the first set of positions may include recording a first set of positions during a period in which the monitored component is centered within a field of view of the camera. In some embodiments, moving the camera about the first rotational axis may include panning the camera and moving the camera about the second rotational axis may include tilting the camera.

According to yet another aspect, one or more machine-readable storage media comprising a plurality of instructions stored thereon that, in response to execution by a robot controller, may cause the robot controller to operate a camera of a pan tilt unit to move the camera about a first rotational axis of the pan tilt unit to at least three different first axis positions, record a first set of positions of a robot tool of a robot in a frame of reference of the robot and a position of the camera in a frame of reference of the pan tilt unit during a period in which the robot tool is within a field of view of the camera for each of the at least three different first axis positions, operate the camera to move the camera about a second rotational axis of the pan tilt unit to at least three different second axis positions, record a second set of positions of the robot tool in the frame of reference of the robot and a position of the camera in the frame of reference of the pan tilt unit during a period in which the robot tool is within a field of view of the camera for each of the at least three different second axis positions, and determine a transformation from the frame of reference of the robot to the frame of reference of the pan tilt unit based on the first set of recorded positions and the second set of recorded positions.

In some embodiments, determining the transformation may include determining a first plane defined by the first set of recorded positions, determining a second plane defined by the second set of recorded positions, determining an intersection line of the first plane and the second plane, and determining an origin of the frame of reference of the pan tilt unit based on the intersection line.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C).

Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
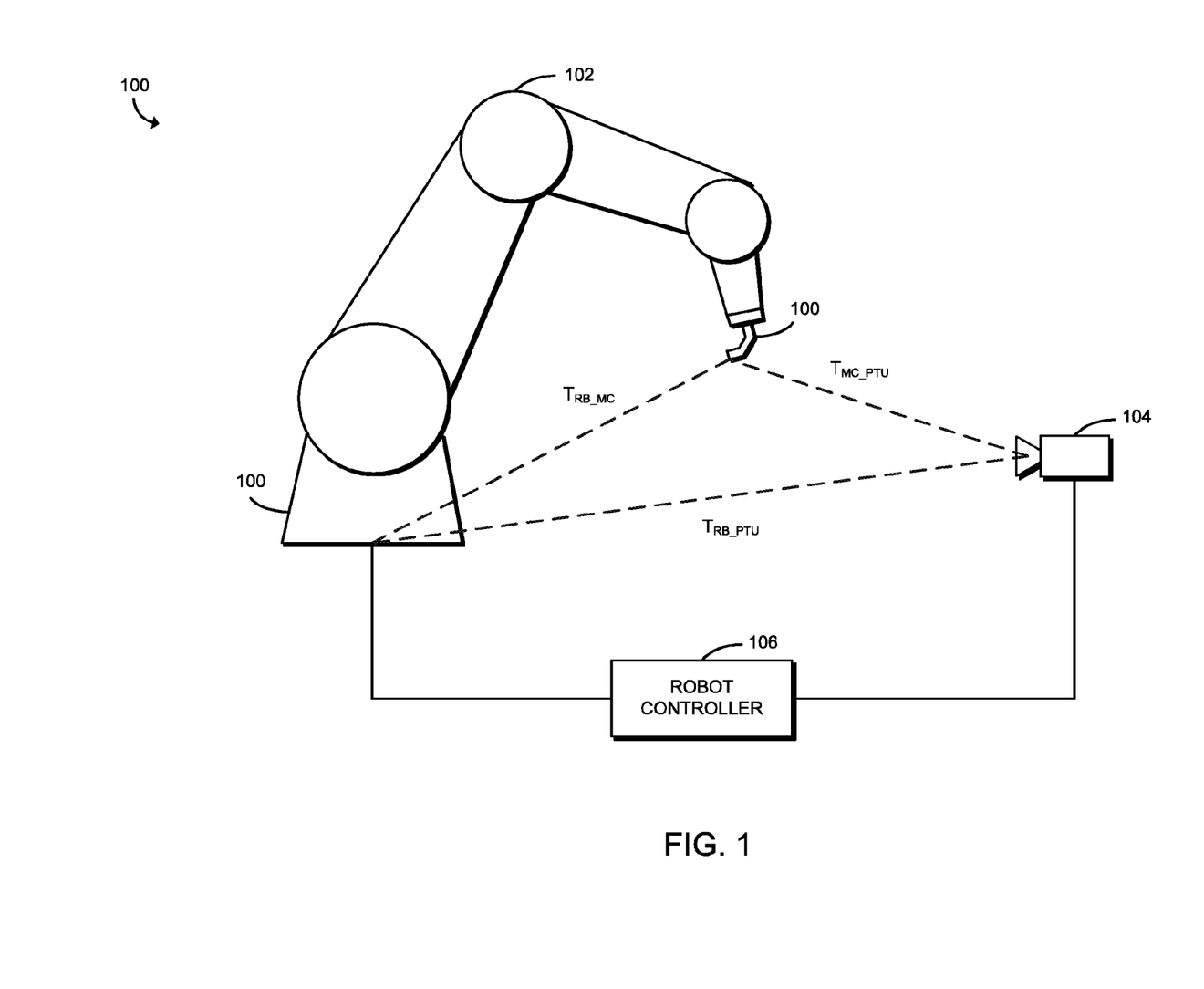
FIG. 1 is a simplified block diagram of at least one embodiment of a system for pan tilt unit calibration.

Referring now to FIG. 1, a system 100 for pan tilt calibration includes a robot 102, a pan tilt unit 104, and a robot controller 106. Although only one robot 102, one pan tilt unit 104, and one robot controller 106 are illustratively shown in FIG. 1, the system 100 may include any number of robots 102, pan tilt units 104, and/or robot controllers 106 in other embodiments. For example, in some embodiments, the system 100 may include a pan tilt unit 104 positioned on opposite sides of the robot 102 (e.g., to monitor a full range of motion of the robot 102). Further, in some embodiments, the pan tilt unit 104 may include a pan tilt unit controller separate from the robot controller 106 that is configured to communicate with the robot controller 106 (e.g., over a network).

As described in detail below, a pan tilt unit may be calibrated to a robot coordinate frame in order to employ an efficient tracking algorithm for monitoring a robot tool/component with the pan tilt unit without using computer vision processing. That is, by calibrating the coordinate system or frame of reference of the pan tilt unit with the coordinate system or frame of reference of the robot, the robot controller may instruct the pan tilt unit to move (e.g., pan and/or tilt) its camera in a particular way based on a known movement of the monitored robot tool/component so that the tool/component will be within the field of view of the camera, thereby eliminated the need to use computer vision techniques to track and "find" the robot tool in captured images. It should further be appreciated that, in some embodiments, by eliminating the need for computer vision algorithms, the pan tilt unit may be integrated with the robot controller to simplify the overall hardware and software requirements of the system.

The illustrative robot 102 includes a robot base 110 and an articulated arm 112 extending from the robot base 110 and capable of motion in multiple axes (i.e., having several independently rotatable joints). As shown, a robot tool 114 is coupled to an end of the articulated arm 112 and configured to perform one or more functions. For example, in various embodiments, the robot tool 114 may be embodied as a gripper or other object manipulator, a welder, a paint gun, or another suitable tool depending on the particular purpose of the robot. Although only one articulated arm 112 and one robot tool 114 are shown in the illustrative embodiment, it should be appreciated that the robot 102 may include any number of arms 112 and/or tools 114 in other embodiments. In some embodiments, the robot 102 may operate within a robot workspace such as a work cell, worktable, or other area.

As described below, the robot tool 114 and/or another component of the robot 102 may be monitored by the pan tilt unit 104. The pan tilt unit 104 may be embodied as any image-capturing device capable of performing the functions described herein. The pan tilt unit 104 includes a camera 120 configured to capture images and/or video of the monitored component(s) of the robot 102 (e.g., the robot tool 114) and a drive unit 122 configured to move the camera 120 (see FIG. 2). The camera 120 may be embodied as any peripheral or integrated device suitable for capturing images, such as a still camera, a video camera, or other device capable of capturing video and/or images. In the illustrative embodiment, the drive unit 122 is configured move the pan tilt unit 104 or, more particularly, the camera 120 both along a horizontal plane (i.e., about a vertical axis) and along a vertical plane (i.e., about a horizontal axis) of the pan tilt unit 104 (not shown). In other words, the drive unit 122 is configured to both "pan" and "tilt" the optical axis of the camera 120 in order to change the field of view of the camera 120. It should be appreciated that, in other embodiments, the pan tilt unit 104 may include a different number of degrees of freedom of movement. Further, in some embodiments, the pan tilt unit 104 may include multiple cameras 120 and/or drive units 122. In the illustrative embodiment, the pan tilt unit 104 is stationary; however, in other embodiments, the pan tilt unit 104 may be located on a moving component of the robot 102 or may otherwise have a dynamic position.

The robot controller 106 is configured to control the movements and/or other operations of the robot 102. For example, the robot controller 106 may interpret, compile, or otherwise execute one or more instructions included in a robot program. In the illustrative embodiment, the robot controller 106 is also configured to control the movements, image/video capturing, and/or other functions of the pan tilt unit 104. However, in other embodiments, the system 100 may include a separate controller configured to control the operation of the pan tilt unit 104. The robot controller 106 may be embodied as any type of computing device capable of performing the functions described herein. For example, the robot controller 106 may be embodied as a computer, a multiprocessor system, a server, a rack-mounted server, a blade server, a programmable logic controller, an embedded controller, an embedded system, a processor-based system, a consumer electronic device, and/or any other computing/communication device.

Figure 2:
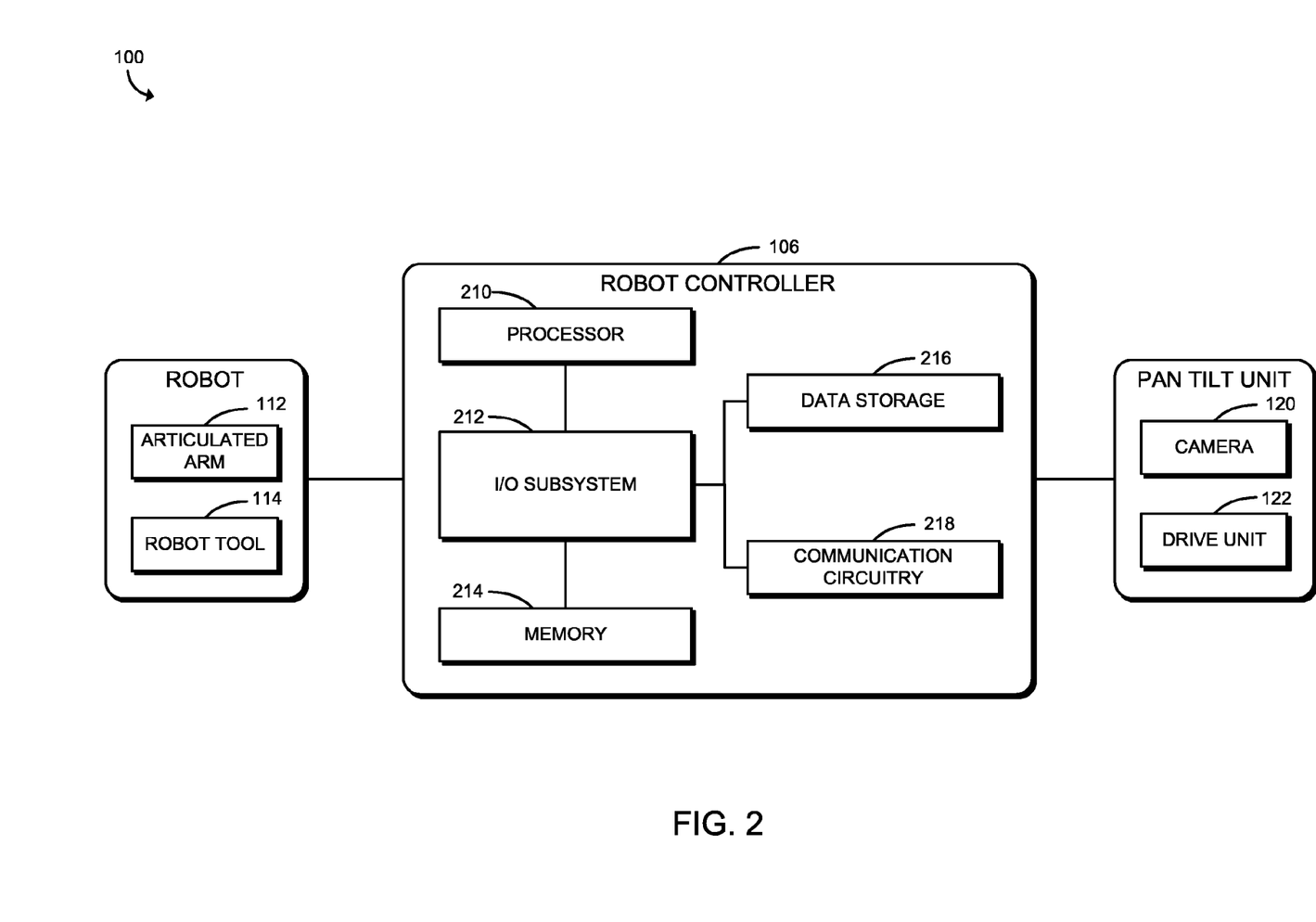
FIG. 2 is a simplified block diagram of at least one embodiment of a robot controller of the system of FIG. 1.

As shown in FIG. 2, the illustrative robot controller 106 includes a processor 210, an input/output ("I/O") subsystem 212, a memory 214, a data storage 216, and a communication circuitry 218. Of course, the robot controller 106 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 214, or portions thereof, may be incorporated in the processor 210 in some embodiments.

The processor 210 may be embodied as any type of processor capable of performing the functions described herein. For example, the processor 210 may be embodied as a single or multi-core processor(s), digital signal processor, microcontroller, or other processor or processing/controlling circuit. Similarly, the memory 214 may be embodied as any type of volatile or non-volatile memory or data storage capable of performing the functions described herein. In operation, the memory 214 may store various data and software used during operation of the robot controller 106 such as operating systems, applications, programs, libraries, and drivers. The memory 214 is communicatively coupled to the processor 110 via the I/O subsystem 212, which may be embodied as circuitry and/or components to facilitate input/output operations with the processor 210, the memory 214, and other components of the robot controller 106. For example, the I/O subsystem 212 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 212 may form a portion of a system-on-a-chip (SoC) and be incorporated, along with the processor 210, the memory 214, and other components of the robot controller 106, on a single integrated circuit chip.

The data storage 216 may be embodied as any type of device or devices configured for short-term or long-term storage of data such as, for example, memory devices and circuits, memory cards, hard disk drives, solid-state drives, or other data storage devices. The data storage 216 and/or the memory 214 may store various data during operation of the robot controller 106 as described herein. For example, various position and/or orientation measurements (e.g., coordinates) in the robot base 110 and/or pan tilt unit 104 frames of reference may be recorded in the data storage 216 and/or the memory 214.

The communication circuitry 218 may be embodied as any communication circuit, device, or collection thereof, capable of enabling communications between the robot controller 106 and other remote devices over a network. For example, in embodiments in which the system 100 includes a separate pan tilt unit controller, the robot controller 106 may communicate with the pan tilt unit controller over a corresponding network and/or communication link. The communication circuitry 218 may be configured to use any one or more communication technologies (e.g., wireless or wired communications) and associated protocols (e.g., Ethernet, Bluetooth®, Wi-Fi®, WiMAX, etc.) to effect such communication.

Figure 3:
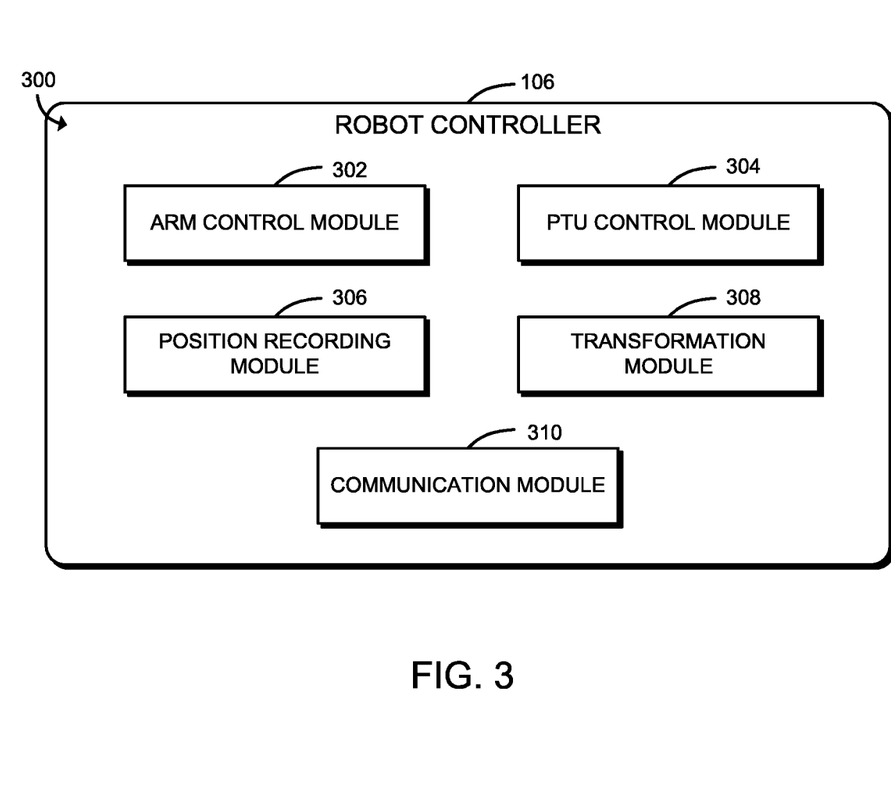
FIG. 3 is a simplified block diagram of at least one embodiment of an environment of the robot controller of FIG. 2.

Referring now to FIG. 3, the illustrative robot controller 106 establishes an environment 300 for pan tilt unit calibration. The illustrative environment 300 of the robot controller 106 includes an arm control module 302, a pan tilt unit (PTU) control module 304, a position recording module 306, a transformation module 308, and a communication module 310. The various modules of the environment 300 may be embodied as hardware, software, firmware, or a combination thereof. For example, the various modules, logic, and other components of the environment 300 may form a portion of, or otherwise be established by, the processor 210 or other hardware components of the robot controller 106. As such, in some embodiments, one or more of the modules of the environment 300 may be embodied as a circuit or collection of electrical devices (e.g., a arm control circuit, a PTU control circuit, a position recording circuit, a transformation circuit, and/or a communication circuit). Additionally, in some embodiments, one or more of the illustrative modules may form a portion of another module.

The arm control module 302 is configured to control the operation of the articulated arm 112 of the robot 102. For example, the arm control module 302 may move the arm 112 in a manner that allows the robot tool 114 to interact with a particular work piece (e.g., to grasp an object). Depending on the particular embodiment, the arm 112 may be controlled based on user input and/or according to a predefined set of motions identified by a robot program.

The PTU control module 304 is configured to control the operation of the pan tilt unit 104. In particular, the PTU control module 304 may control the camera 120 of the pan tilt unit 104 to capture various images/video of a monitored component of the robot 102 (e.g., the robot tool 114). Further, the PTU control module 304 may control the drive unit 122 to move the camera 120 in order to change the field of view of the camera 120. As described in greater detail below, the PTU control module 304 may move the pan tilt unit 104 to various positions about the axes of the pan tilt unit 104 during the calibration of the pan tilt unit 104. Further, the PTU control module 304 may move the camera 120 such that the monitored component is within the field of view of the camera 120 based on the kinematics of the monitored component (e.g., based on the movement of the monitored component such as the robot tool 114 relative to the robot base 110).

The position recording module 306 is configured to record the position and/or orientation of the monitored component of the robot 102 (e.g., the robot tool 114) in the coordinate system or frame of reference of the robot 102 or, more specifically, the robot base 110. In particular, in some embodiments, the position/orientation of the monitored component relative to the origin of the coordinate system of the robot base 110 may be recorded. It should be appreciated that the robot 102 may be pre-calibrated such that the robot controller 106 may determine the position and/or orientation of the robot tool 114 or any other monitored component of the robot 102 based on the kinematics of the robot 102 (e.g., based on the motion of the articulated arm 112). Additionally, the position recording module 306 is configured to record the position and/or orientation of the camera 120 of the pan tilt unit 104 relative to the coordinate system or frame of reference of the pan tilt unit 104. In some embodiments, the position/orientation of the camera 120 relative to the origin of the coordinate system of the pan tilt unit 104 may be recorded.

The transformation module 308 is configured to calculate or otherwise determine a transformation between the coordinate system or frame of reference defined by the robot base 110 to the coordinate system or frame of reference defined by the pan tilt unit 104. As described below, to do so, the transformation module 308 may determine/calculate the planes in three-dimensional (3D) space corresponding with the pan and tilt motions of the pan tilt unit 104 and the intersection line between the planes based on the various positions/orientations recorded by the position recording module 306. Further, the transformation module 308 may calculate or determine the PTU frame origin and optimize/improve the accuracy of the transformation. Based on the transformation, the transformation module 308 may calculate a proper orientation of the pan tilt unit 104 (i.e., of the camera 120) to capture the robot tool 114 or other monitored component based on the kinematics of the robot 102.

The communication module 310 handles the communication between the robot controller 106 and other devices/components of the system 100. For example, as described herein, in some embodiments, the system 100 may include a separate controller configured to operate the pan tilt unit 104 in which case the robot controller 106 may communicate with the pan tilt unit controller via the communication module 310.

Figure 4:
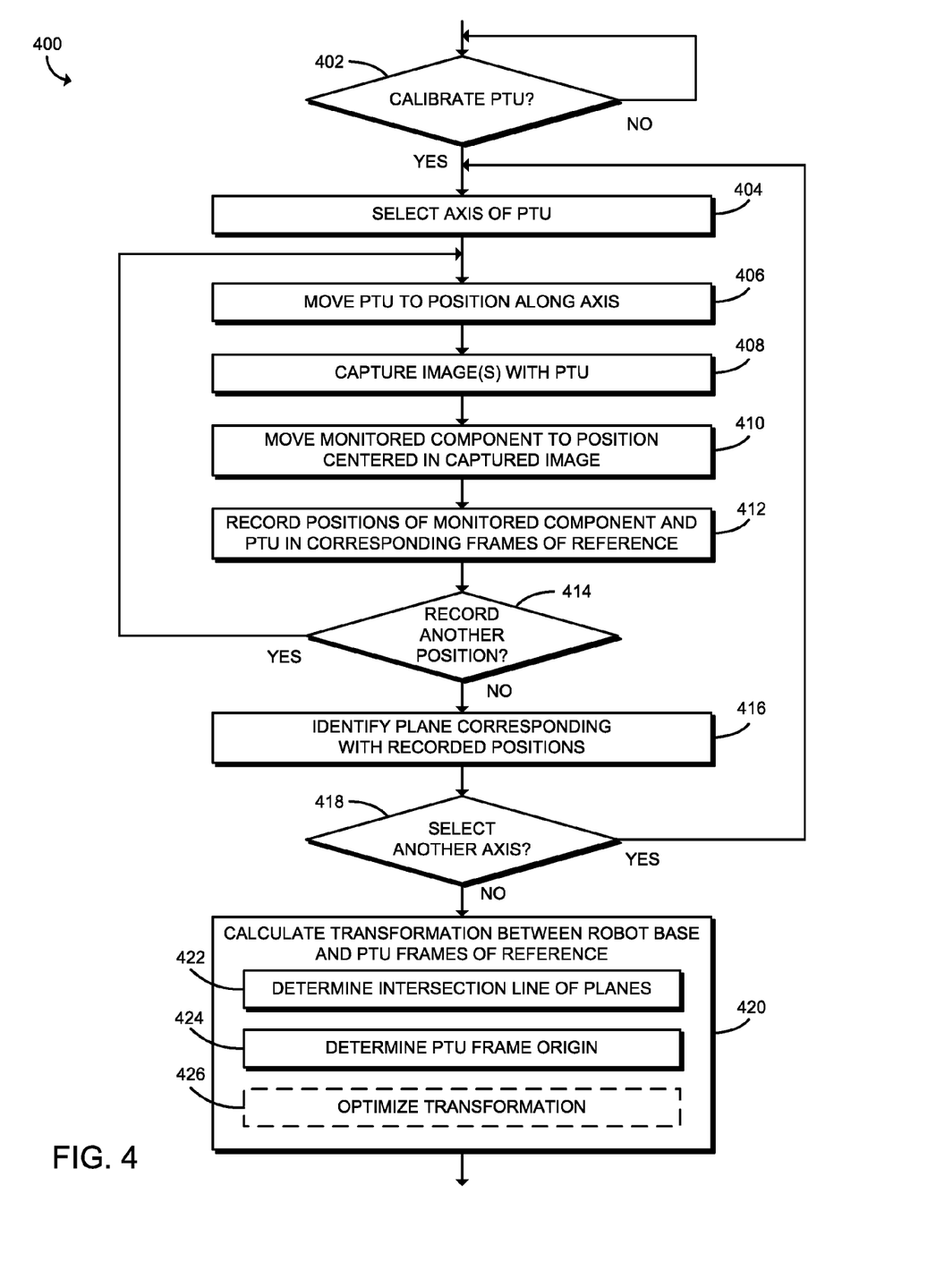
FIG. 4 is a simplified flow diagram of at least one embodiment of a method for pan tilt unit calibration that may be executed by the robot controller of FIG. 2.

Referring now to FIG. 4, in use, the robot controller 106 may execute a method 400 for calibrating the pan tilt unit 104. The illustrative method 400 begins with block 402 in which the robot controller 106 determines whether to calibrate the pan tilt unit 104. If so, in block 404, the robot controller 106 selects an axis of the pan tilt unit 104. As described above, the illustrative camera 120 of the pan tilt unit 104 is configured to move about a vertical axis (i.e., to pan) and about a horizontal axis (i.e., to tilt). It should be appreciated that, in the illustrative embodiment, movement of the pan tilt unit 104 about the vertical axis results movement of the optical axis of the camera 120 along a horizontal plane, whereas movement of the pan tilt unit 104 about the horizontal axis results in movement of the optical axis of the camera 120 along a vertical plane.

In block 406, the robot controller 106 operates the pan tilt unit 104 to move the pan tilt unit 104 to some position about the selected axis. That is, the illustrative pan tilt unit 104 "pans" or "tilts" the camera 120 depending on the selected axis. In some embodiments, the camera 120 is moved by a random or arbitrarily determined distance about the selected axis. However, in other embodiments, the robot controller 106 may operate the pan tilt unit 104 to move the camera 120 about the axis by a predefined amount. In block 408, the robot controller 106 controls the pan tilt unit 104 to capture one or more images with the camera 120. It should be appreciated that, in some embodiments, the camera 120 is configured to capture still images, whereas in other embodiments, the camera 120 is configured to capture video images. For example, in some embodiments, the camera 120 may be configured to continuously capture video.

In block 410, the robot controller 106 operates the robot 102 to move the monitored component to a position centered in the captured image(s) of the camera 120. For example, the robot controller 106 may move the articulated arm 112 of the robot 102 to move the robot tool 114 to a position that would result in the robot tool 114 being in the center of a captured image. It should be appreciated that, in some embodiments, the blocks 408, 410 may be performed concurrently or repeatedly to result in a captured image in which the monitored component is centered in the image. For example, in some embodiments, the camera 120 may capture video images while the robot tool 114 is moved to the center of the captured image(s). It should be appreciated that the robot controller 106 may use any suitable algorithms and/or techniques to determine that the monitored component is centered within a captured image.

In some embodiments, the robot controller 106 may utilize computer vision and/or image processing algorithms to make such a determination. For example, the robot controller 106 may utilize feature detection algorithms, techniques, and filters such as Speeded Up Robust Features (SURF), Scale-Invariant Feature Transform (SIFT), Multi-Scale Oriented Patches (MOPS), Canny, image gradient operators, and Sobel filters to identify features (e.g., interest points such as corners, edges, blobs, etc.) of the captured image and a reference image (e.g., of the monitored component). Further, in some embodiments, the robot controller 106 may utilize feature matching algorithms such as the Random Sample Consensus (RANSAC) algorithm to determine whether any features identified in the captured image and the reference image correspond with one another and, if so, the corresponding locations of those features. Additionally or alternatively, the robot controller 106 may utilize image segmentation algorithms (e.g., pyramid segmentation, watershed algorithms, etc.) for identifying objects in an image.

In block 412, the robot controller 106 records the positions and/or orientations of the monitored component (e.g., the robot tool 114) and the pan tilt unit 104 (e.g., the camera 120) in the corresponding frames of reference or coordinate systems. In particular, in the illustrative embodiment, the robot controller 106 records the position/orientation of the monitored component relative to the origin of the coordinate system defined by the robot base 110. Further, the robot controller 106 records the position/orientation of the camera 120 of the pan tilt unit 104 relative to the origin of the coordinate system defined by the pan tilt unit 104 (i.e., the PTU origin).

In block 414, the robot controller 106 determines whether to record another position. That is, the robot controller 106 determines whether to move the pan tilt unit 104 again and record the positions/orientations of the monitored component and the pan tilt unit 104 relative to the corresponding frames of reference. In the illustrative embodiment, the robot controller 106 records the positions/orientations of the monitored component and the pan tilt unit 104 in three different positions/orientations. However, in other embodiments, the robot controller 106 may record any different number of positions of the monitored component and the pan tilt unit 104 suitable for performing the functions described herein (e.g., more than three). If the robot controller 106 determines to record another position, the method 400 returns to block 406 in which the robot controller 106 moves the pan tilt unit 104.

Otherwise, the robot controller 106 identifies the plane corresponding with the recorded positions in block 416. For example, the robot controller 106 determines the plane in the coordinate system of the pan tilt unit 104 that includes the three recorded points (i.e., the points recorded in the PTU coordinate system). It should be appreciated that a plane that includes three points may be deterministically identified based on the three points, provided that the points are not collinear. In block 418, the robot controller 106 determines whether to select another axis of the pan tilt unit 104. As described above, in the illustrative embodiment, the pan tilt unit 104 is configured to move (e.g., rotate) about a vertical axis and a horizontal axis. In the illustrative embodiment, the robot controller 106 is configured to record positions and determine the planes defined by movement about each of those axes. Accordingly, in the illustrative embodiment, the method 400 returns to block 404 in which the robot controller 106 selects the other axis to record the positions about the axis and identify the corresponding plane.

In block 420, the robot controller 106 calculates the transformation between the frame of reference or coordinate system of the robot base 110 and the frame of reference or coordinate system of the pan tilt unit 104 based on the recorded positions and/or the determined planes. In doing so, in block 422, the robot controller 106 determines the intersection line of the identified planes and, in block 424, the robot controller 106 determines the origin of the frame of reference or coordinate system of the pan tilt unit 104 as described in greater detail below. In some embodiments, in block 426, the robot controller 106 may optimize or improve the accuracy of the transformation. In some embodiments, the optimization techniques may be incorporated into the determination of the transformation itself.

Figure 5:
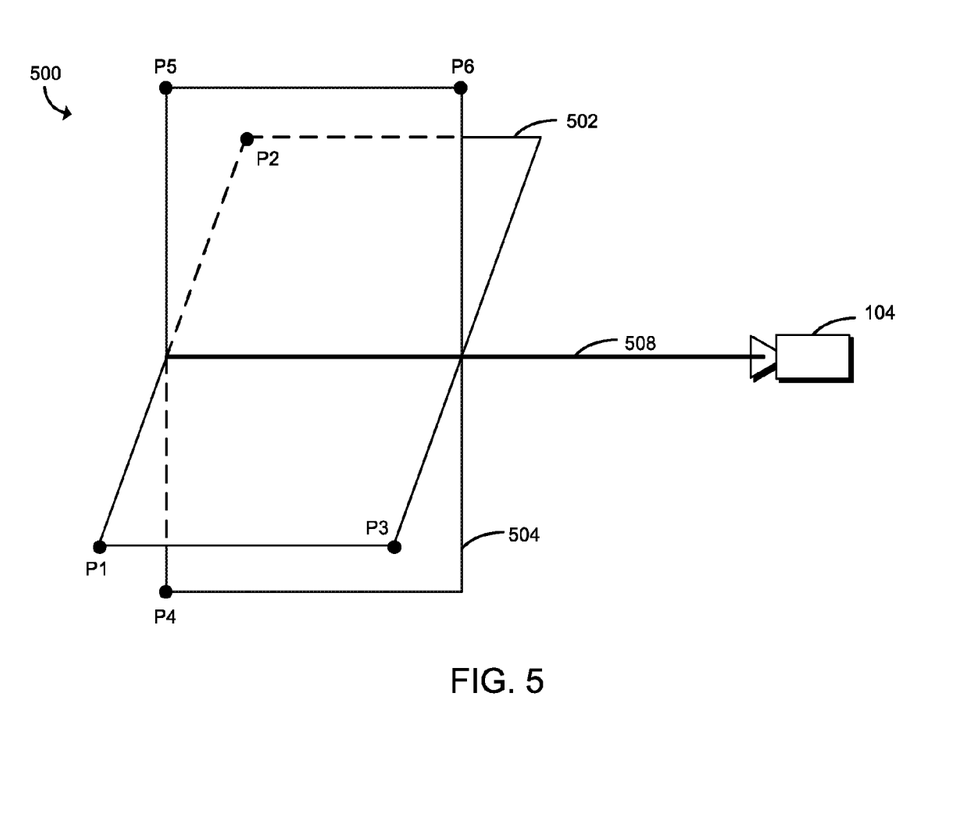
FIGS. 5-6 are simplified illustrations that show various geometrical relationships of the system of FIG. 1.

In particular, in the illustrative embodiment, in order to calculate or determine the transformation between the robot base frame and the PTU frame, the robot controller 106 may determine a first plane 502 corresponding with horizontal motion (i.e., panning) of the pan tilt unit 104 based on the recorded points (e.g., P1, P2, and P3) and a second plane 504 corresponding with the vertical motion (i.e., tilting) of the pan tilt unit 104 based on those recorded points (e.g., P4, P5, P6) as shown in FIG. 5. It should be appreciated that, because the illustrative planes 502, 504 are orthogonal or approximately orthogonal (i.e., non-parallel), the planes 502, 504 intersect at a particular line 508. In the illustrative embodiment, the robot controller 106 identifies the intersecting line 508 of those planes 502, 504.

Figure 6:
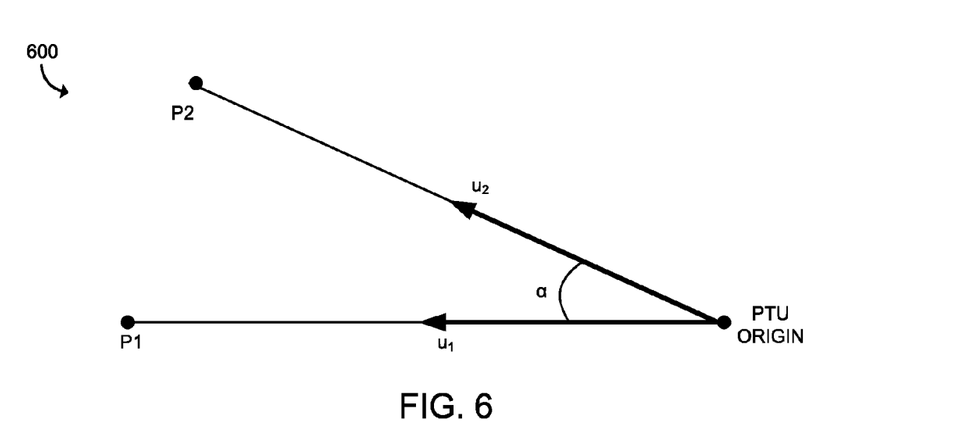

It should be appreciated that the intersecting line 508 may be represented according to $L(t)=P+st$, where P is a three-dimensional point on the line 508 (e.g., $P=(x, y, z)$), s is a unit vector pointing in one of the directions of the line 508, and t is an independent variable. Further, a vector, $\vec{u}_1$, extending from the PTU origin ($Origin_{PTU}$) to a point (P1) as shown in FIG. 6 may be expressed according to $\vec{u}_1=P_1-Origin_{PTU}$. Similarly, a vector, $\vec{u}_2$, extending from the PTU origin to a point (P2) may be expressed according to $\vec{u}_2=P_2-Origin_{PTU}$. It should be appreciated that, in some embodiments, each of the vectors $\vec{u}_1$ and $\vec{u}_2$ may be (or may be calculated to be) of unit length and, therefore, may be a unit vector. As described above, each of the points (P1, P2) were recorded based on movement of the pan tilt unit 104 within the plane 502. Of course, in some embodiments, each of the other recorded points may be similarly utilized to generate corresponding vectors. It should be appreciated that, in the illustrative embodiment, the angle ($\alpha$) is known as it corresponds with the angular movement of the pan tilt unit 104 between the points (P1, P2) during the recording process described above. The PTU origin ($Origin_{PTU}$) may be expressed according to $Origin_{PTU}=P_0+st$ for some point $P_0$ on the line 508 and some point $t=t_0$. In some embodiments, the vectors and equations described above may be utilized to identify the PTU origin. In particular, it should be appreciated that $\vec{u}_1 \cdot \vec{u}_2 = \|\vec{u}_1\|\|\vec{u}_2\|\cos(\alpha)$ (i.e., the dot product of the vectors, $\vec{u}_1$ and $\vec{u}_2$) and, by substitution, the equation:

$$(P_1-P_0-st) \cdot (P_2-P_0-st) = \|(P_1-P_0-st)\| \cdot \|(P_2-P_0-st)\| \cdot \cos(\alpha)$$

is satisfied. In the illustrative embodiment, the robot controller 106 may solve the equation in terms of t to identify the location of the PTU origin (e.g., in the frame of reference of the robot base 110). The robot controller 106 may utilize the PTU origin to determine the mapping or transformation, $T_{RB\_PTU}$, from the frame of reference of the robot base 110 to the frame of reference of the pan tilt unit 104 ($P_{RB}=T_{RB\_PTU} \cdot P_{PTU}$) such that a point in the robot base frame ($P_{RB}$) may be identified as a point in terms of the PTU frame ($P_{PTU}$), or vice-versa. For example, in some embodiments, a rotation transformation may be constructed from the line 508 and one or more of the points (P1-P6) based on the determined origin and the coordinates of the points determined in the robot coordinate frame. In another embodiment, one or more of the angles ($\alpha_i$) and/or one or more of the points between the corresponding angle(s) may be utilized in determining the transformation. Accordingly, the robot controller 106 may utilize the position and kinematics of the articulated arm 112 and the robot tool 114 (or other monitored component) to determine a proper position/orientation of the pan tilt unit 104 to monitor the robot tool 114.

As indicated above, in some embodiments, the accuracy of the transformation may be optimized or improved. In doing so, the points in the PTU frame may be expressed in terms of spherical coordinates rather than Cartesian coordinates. That is, the points may be expressed according to $x_{PTU}=r \cdot \cos(\phi) \cdot \sin(\theta)$, $y_{PTU}=r \cdot \sin(\phi) \cdot \sin(\theta)$, and $z_{PTU}=r \cdot \cos(\theta)$. Further, by substitution, the transformation equation ($P_{RB}=T_{RB\_PTU} \cdot P_{PTU}$) may be represented according to:

$$P_{RB} = T_{RB\_PTU} \cdot r \cdot \begin{bmatrix} \cos(\phi) \cdot \sin(\theta) \\ \sin(\phi) \cdot \sin(\theta) \\ \cos(\theta) \end{bmatrix}$$

In some embodiments, the transformation may be represented in terms of a quaternion to rotation matrix conversion according to:

$$P_{RB} = r \cdot \begin{bmatrix} w^2+x^2-y^2-z^2 & 2xy-2wz & 2xz+2xy & 0 \\ 2xy+2wz & w^2-x^2+y^2-z^2 & 2yz-2wx & 0 \\ 2xz-2wy & 2yz+2wx & w^2-x^2-y^2+z^2 & 0 \\ 0 & 0 & 0 & 1 \end{bmatrix} \cdot P\alpha_{PTU} + \underbrace{\phantom{XXXXXX}}_{T_{RB\_PTU}}$$

and solved using a Levenberg-Marquardt algorithm (LMA). It should be appreciated that, in the illustrative embodiment, w=1, due to homogeneity. Further, in other embodiments, the transformation may be otherwise represented and/or expressed (e.g., as a different three-dimensional rotation matrix). Of course, in other embodiments, the robot controller 106 may use any other suitable algorithms, techniques, and/or mechanisms to optimize the transformation in terms of, for example, accuracy, efficiency, and/or other parameters.

The invention claimed is:

1. A robot system for calibrating a pan tilt unit, the robot system comprising:
    a robot;
    arm control circuitry configured to operate an articulating arm and a robot tool of the robot;
    pan tilt unit control circuitry to (i) move a camera of the pan tilt unit about a first rotational axis of the pan tilt unit to at least three different first axis positions and (ii) move the camera about a second rotational axis of the pan tilt unit to at least three different second axis positions;
    position recording circuitry to (i) record a first set of positions of the robot tool in a frame of reference of the robot and a position of the camera in a frame of reference of the pan tilt unit during a period in which the robot tool is within a field of view of the camera for each of the at least three different first axis positions and (ii) record a second set of positions of the robot tool in the frame of reference of the robot and a position of the camera in the frame of reference of the pan tilt unit during a period in which the robot tool is within a field of view of the camera for each of the at least three different second axis positions; and
    transformation circuitry to determine a transformation from the frame of reference of the robot to the frame of reference of the pan tilt unit based on the first set of recorded positions, the second set of recorded positions, a first origin of the frame of reference of the robot, a second origin of the frame of reference of the pan tilt unit, a first intersection line between one or more planes generated using the first set of recorded positions and the second set of recorded positions, and a second intersection line between one or more planes generated using the at least three different first axis positions and the at least three different second axis positions.

2. The robot system of claim 1, wherein the frame of reference of the robot is a coordinate system defined by a base of the robot.

3. The robot system of claim 1, wherein to determine the transformation comprises to:
    determine a first plane defined by the first set of recorded positions;
    determine a second plane defined by the second set of recorded positions;
    determine a third plane defined by the at least three different first axis positions; and
    determine a fourth plane defined by the at least three different second axis positions.

4. The robot system of claim 3, wherein to determine the transformation comprises to determine (i) the first intersection line between the first plane and the second plane and (ii) the second intersection line between the third plane and the fourth plane.

5. The robot system of claim 4, wherein to determine the transformation comprises to determine (i) the first origin of the frame of reference of the robot based on the first intersection line and (ii) the second origin of the frame of reference of the pan tilt unit based on the second intersection line.

6. The robot system of claim 1, wherein the arm control circuitry is to move the robot tool to a position such that the robot tool is centered within a field of view of the camera for each of the at least three different first axis positions; and
    wherein to record the first set of positions comprises to record the first set of positions during a period in which the robot tool is centered within the field of view of the camera.

7. The robot system of claim 1, wherein to move the camera about the first rotational axis comprises to pan the camera; and
    wherein to move the camera about the second rotational axis comprises to tilt the camera.

8. The robot system of claim 1, wherein the transformation circuitry is further to:
    determine a position of the robot tool in the frame of reference of the robot; and
    determine a corresponding position of the robot tool in the frame of reference of the pan tilt unit based on the transformation.

9. The robot system of claim 8, wherein the pan tilt unit control circuitry is further to move the camera to a position in which the corresponding position of the robot tool is within a field of view of the camera.

10. A method for calibrating a pan tilt unit with a robot, the method comprising:
    moving a camera of the pan tilt unit about a first rotational axis of the pan tilt unit to at least three different first axis positions;

recording a first set of positions of a monitored component of the robot in a frame of reference of the robot and a position of the camera in a frame of reference of the pan tilt unit during a period in which the monitored component is within a field of view of the camera for each of the at least three different first axis positions;

moving the camera about a second rotational axis of the pan tilt unit to at least three different second axis positions;

recording a second set of positions of the monitored component in the frame of reference of the robot and a position of the camera in the frame of reference of the pan tilt unit during a period in which the monitored component is within a field of view of the camera for each of the at least three different second axis positions; and determining a transformation from the frame of reference of the robot to the frame of reference of the pan tilt unit based on the first set of recorded positions, the second set of recorded positions, a first origin of the frame of reference of the robot, a second origin of the frame of reference of the pan tilt unit, a first intersection line between one or more planes generated using the first set of recorded positions and the second set of recorded positions, and a second intersection line between one or more planes generated using the at least three different first axis positions and the at least three different second axis positions.

11. The method of claim 10, wherein the frame of reference of the robot is a coordinate system defined by a base of the robot.

12. The method of claim 10, wherein the monitored component is a robot tool secured to an articulated arm of the robot.

13. The method of claim 10, wherein determining the transformation comprises:
determining a first plane defined by the first set of recorded positions;
determining a second plane defined by the second set of recorded positions;
determine a third plane defined by the at least three different first axis positions; and
determine a fourth plane defined by the at least three different second axis positions.

14. The method of claim 13, wherein determining the transformation comprises determining (i) the first intersection line between the first plane and the second plane and (ii) the second intersection line between the third plane and the fourth plane.

15. The method of claim 14, wherein determining the transformation comprises determining (i) the first origin of the frame of reference of the robot based on the first intersection line and (ii) the second origin of the frame of reference of the pan tilt unit based on the second intersection line.

16. The method of claim 10, further comprising improving an accuracy of the transformation by applying a Levenberg-Marquardt algorithm based on the first set of recorded positions and the second set of recorded positions.

17. The method of claim 10, wherein recording the first set of positions comprises recording a first set of positions during a period in which the monitored component is centered within a field of view of the camera.

18. The method of claim 10, wherein moving the camera about the first rotational axis comprises panning the camera; and
wherein moving the camera about the second rotational axis comprises tilting the camera.

19. One or more non-transitory machine-readable storage media comprising a plurality of instructions stored thereon that, in response to execution by a robot controller, cause the robot controller to:
operate a camera of a pan tilt unit to move the camera about a first rotational axis of the pan tilt unit to at least three different first axis positions;
record a first set of positions of a robot tool of a robot in a frame of reference of the robot and a position of the camera in a frame of reference of the pan tilt unit during a period in which the robot tool is within a field of view of the camera for each of the at least three different first axis positions;
operate the camera to move the camera about a second rotational axis of the pan tilt unit to at least three different second axis positions;
record a second set of positions of the robot tool in the frame of reference of the robot and a position of the camera in the frame of reference of the pan tilt unit during a period in which the robot tool is within a field of view of the camera for each of the at least three different second axis positions; and
determine a transformation from the frame of reference of the robot to the frame of reference of the pan tilt unit based on the first set of recorded positions, the second set of recorded positions, a first origin of the frame of reference of the robot, a second origin of the frame of reference of the pan tilt unit, a first intersection line between one or more planes generated using the first set of recorded positions and the second set of recorded positions, and a second intersection line between one or more planes generated using the at least three different first axis positions and the at least three different second axis positions.

20. The one or more non-transitory machine-readable storage media of claim 19, wherein to determine the transformation comprises to:
determine a first plane defined by the first set of recorded positions;
determine a second plane defined by the second set of recorded positions;
determine a third plane defined by the at least three different first axis positions;
determine a fourth plane defined by the at least three different second axis positions
determine the first intersection line of the first plane and the second plane;
determine the second intersection line between the third plane and the fourth plane;
determine the first origin of the frame of reference of the robot based on the first intersection line; and
determine the second origin of the frame of reference of the pan tilt unit based on the second intersection line.

* * * * *